US008427996B2

(12) United States Patent  
Woodward et al.

(10) Patent No.: US 8,427,996 B2  
(45) Date of Patent: Apr. 23, 2013

(54) METHOD FOR SELECTING A CHANNEL IN A MULTI-CHANNEL COMMUNICATION SYSTEM

(75) Inventors: Timothy G. Woodward, Tempe, AZ (US); Gerald R. Drobka, Naperville, IL (US); James E. Eastwood, Bellingham, WA (US); Nathanael P. Kuehner, Palatine, IL (US); John G. Lambrou, Scottsdale, AZ (US); Todd A. Leigh, East Lansing, MI (US)

(73) Assignee: Motorola Solutions, Inc., Schaumburg, IL (US)

( * ) Notice: Subject to any disclaimer, the term of this patent is extended or adjusted under 35 U.S.C. 154(b) by 545 days.

(21) Appl. No.: 12/344,729

(22) Filed: Dec. 29, 2008

(65) Prior Publication Data  
US 2010/0165904 A1 Jul. 1, 2010

(51) Int. Cl.  
H04W 48/16 (2009.01)

(52) U.S. Cl.  
USPC ........... 370/312; 370/329; 370/338; 370/279; 455/519; 455/518; 455/520

(58) Field of Classification Search .................. 370/312, 370/329, 338, 337, 279; 455/518, 519, 520, 455/509  
See application file for complete search history.

(56) References Cited

U.S. PATENT DOCUMENTS

| | | | | |
|---|---|---|---|---|
| 5,724,648 A * | 3/1998 | Shaughnessy et al. | ....... | 455/519 |
| 5,956,648 A * | 9/1999 | Brennan et al. | ............... | 455/518 |
| 6,252,859 B1 * | 6/2001 | Rhodes et al. | ................ | 370/329 |
| 6,763,243 B2 * | 7/2004 | Wolf et al. | .................... | 455/519 |
| 6,944,137 B1 * | 9/2005 | Pan et al. | ...................... | 370/266 |
| 2003/0058824 A1 * | 3/2003 | Petterson et al. | ............. | 370/338 |
| 2004/0005904 A1 * | 1/2004 | Wolf et al. | .................... | 455/519 |
| 2004/0180682 A1 | 9/2004 | Kim | | |
| 2006/0063553 A1 * | 3/2006 | Iyer et al. | ....................... | 455/519 |
| 2006/0154682 A1 * | 7/2006 | Shim | ............................ | 455/518 |
| 2006/0193273 A1 * | 8/2006 | Passier et al. | ................. | 370/310 |
| 2008/0161029 A1 * | 7/2008 | McDonald et al. | ........... | 455/509 |
| 2008/0207241 A1 * | 8/2008 | Namm et al. | .................. | 455/518 |
| 2008/0311946 A1 * | 12/2008 | Britton | ......................... | 455/518 |

OTHER PUBLICATIONS

PCT International Search Report Dated Jul. 29, 2010.  
International Preliminary Report on Patentability for International Application No. PCT/US2009/069086 mailed on Jun. 29, 2011.  
Written Opinion of the International Searching Authority for International Application No. PCT/US2009/069086 mailed on Jul. 29, 2010.

* cited by examiner

*Primary Examiner* — Ricky Ngo  
*Assistant Examiner* — Rasheed Gidado  
(74) *Attorney, Agent, or Firm* — Valerie M. Davis; Kenneth A. Haas

(57) ABSTRACT

A method for selecting a channel for group communications in a conventional multi-channel communication system comprises receiving, for a plurality of channels in the multi-channel communication system, a talkgroup assignment list for the channels that identifies a set of talkgroups assigned to use the corresponding channels. A subscriber unit receives talkgroup assignment lists for multiple different channels, determines a desired talkgroup, and selects a channel assigned to the desired talkgroup using the received talkgroup assignment. The talkgroup assignment list is developed for at least one channel in the multi-channel communication system and identifies a set of talkgroups assigned to use the corresponding channel. The list is transmitted for the channel to a subscriber unit and is used by the subscriber unit to register with the system and affiliate with a talkgroup supported by the channel in the conventional multi-channel communication system.

12 Claims, 4 Drawing Sheets

METHOD FOR SELECTING A CHANNEL IN A MULTI-CHANNEL COMMUNICATION SYSTEM

TECHNICAL FIELD

The technical field relates generally to communication systems, and in particular, it relates to a method of selecting a channel for group communications in a conventional multi-channel communication system.

BACKGROUND

Multi-channel (or "wide area") communication systems provide wide-area coverage for users (also referred to herein as "subscribers") of the communication system. These communication systems generally comprise a number of radio frequency sites (RF site) corresponding to different general geographic coverage areas defined by a frequency range of one or more infrastructure devices. The infrastructure and corresponding infrastructure devices support and manage one or more communication channels in the coverage area. Accordingly, for purposes of the teachings herein, an RF site includes the infrastructure that serves a particular coverage area with one or more channels for wireless communication device transmissions. Some or all of the infrastructure devices in a multi-channel communication system may be networked or connected together via a backend network to provide wide-area coverage via one or more wide-area channels, and in many instances two or more of the coverage areas and thus, channels, have some degree of overlap.

Multi-channel communication systems may be designed as trunked systems or conventional systems. In trunked systems, a limited number of communication channels are shared among a much larger number of subscribers to facilitate efficient use of the system's communication resources. Thus, to afford each subscriber a reasonable opportunity to use the system's resources, one or more control channels are utilized by the infrastructure to allocate and switch the shared resources between the many subscribers in the system. In general, when a subscriber wants to communicate on the trunked system, he or she sends a request via a wireless communication unit (hereinafter referred to as a "subscriber unit") on a control channel to communicate with another subscriber or group of subscribers (also referred to herein as a "talkgroup") on their subscriber units. In turn, the requesting subscriber unit (and the subscriber units to which it attempts to communicate) receives back on the control channel the allocation of a channel to use for communicating. When the communication is concluded, the allocated channel is released for use by other subscriber units in the system.

In conventional systems, on the other hand, a number of communication channels are also shared amongst a number of subscribers (although the number of subscribers per channel is typically much smaller than in trunked systems). There is no control or switching mechanism, however, provisioned in the infrastructure to allocate the resources among the subscribers in the system. Thus, in contrast to a trunked system, each channel in a conventional system is dedicated to one or more talkgroups. The subscriber members of each assigned talkgroup control access to the channel through their subscriber units by manually selecting the channel or selecting the talkgroup that is assigned to the channel in order to start a communication session and transmit and receive media during the session. Currently, narrowband subscriber units are commonly configured for group communications with members of a known group, also known as a talkgroup, simply with the press of a button. Public safety systems enjoy the use of the talkgroup capability of the narrowband subscriber units.

Conventional channels are typically provisioned in the subscriber unit and selected by the user of the subscriber unit through a knob or menu, etc. If a subscriber unit is intended to operate in the coverage area of multiple conventional channels (particularly for wide-area conventional operation), the user needs to know what conventional channel coverage area he is in, and manually switch to the appropriate channel for that coverage area. However, in wide-area conventional systems, the user may not even know, and the subscriber unit may not be configured with channels for, the coverage area of the wide-area system.

In a trunking system, a full-time control channel allows infrastructure control of channel assignments and transmission of adjacent control channel information. This does not solve the problem for most conventional systems, however, because of the cost of the infrastructure, and the system loading required to take advantage of a full-time control channel.

Alternatively, vote scan systems program subscriber units with a number of frequencies, and allow the subscriber units to use any of the frequencies. The subscriber unit scans these frequencies looking for a transmission. The disadvantage of this approach is that a preamble is necessary on every infrastructure transmission to allow time for the scanning subscriber units to scan to the transmit channel and detect the transmission, increasing channel access time.

Accordingly, what is needed is a method for selecting a channel for group communications in a conventional multi-channel communication system.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
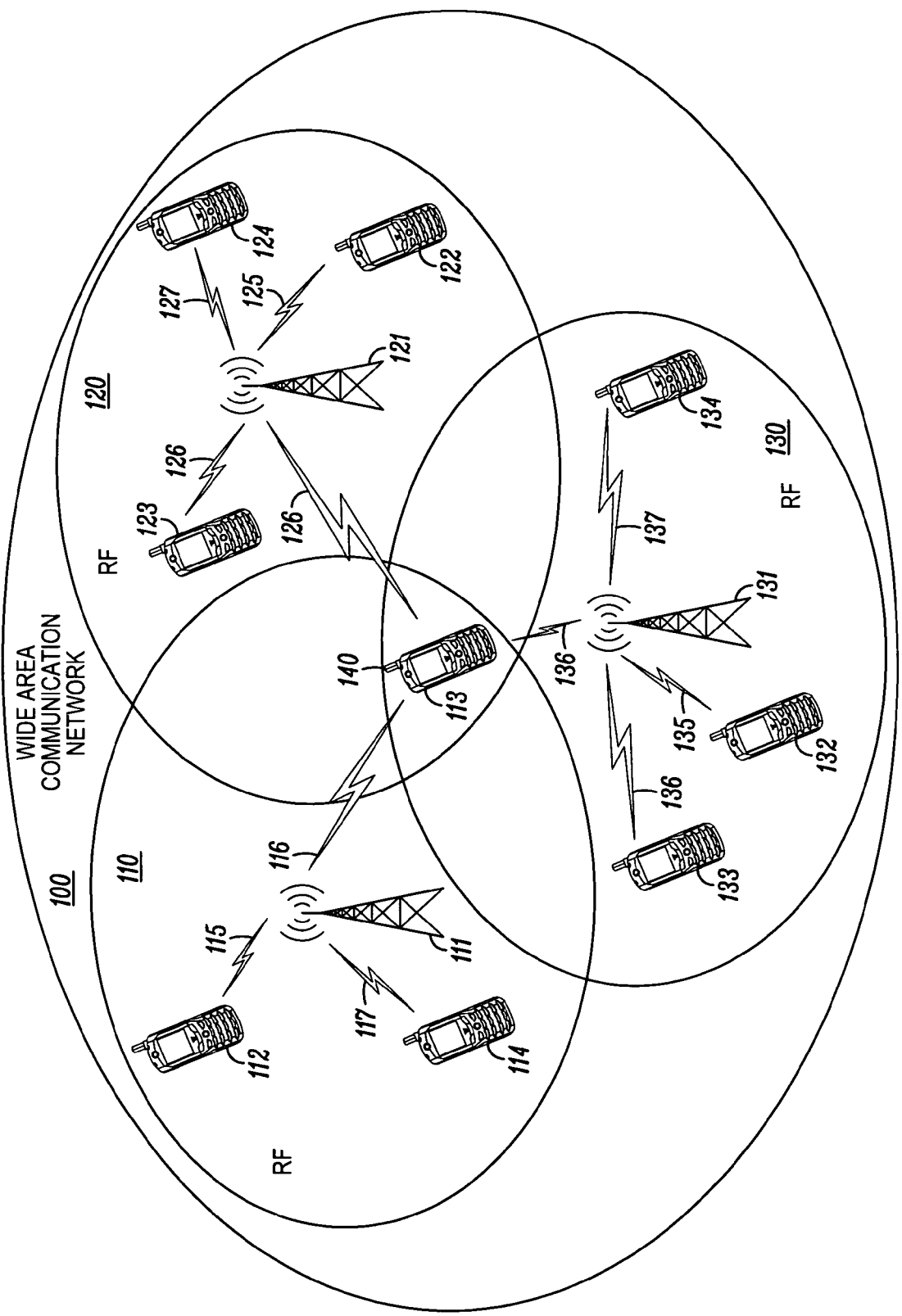
FIG. 1 is a diagram of a conventional multi-channel communication system implementing various embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments and elements. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

A method for selecting a channel for group communications in a conventional multi-channel communication system comprises receiving, for each of a plurality of channels in a multi-channel communication system, a talkgroup assignment list for at least one channel that identifies a set of talkgroups assigned to use the corresponding channel. A subscriber unit, having received the talkgroup lists, determines a desired talkgroup and selects a channel assigned to the desired talkgroup using the received talkgroup assignment lists. The selected channel is used for communicating with the desired talkgroup.

The received talkgroup assignment lists comprise a first talkgroup assignment list for a first channel having a geographic coverage area in which the subscriber unit is currently geographically located. A second talkgroup assignment list can also be received for a channel adjacent to or overlapping the coverage area of the first channel. If the subscriber unit moves into a coverage area for the adjacent channel, the subscriber unit uses the second talkgroup assignment list to select the adjacent channel to continue communicating with the desired talkgroup. A channel may be adjacent to another channel if it is co-located at the same site, which would allow the concept of channel redundancy within the same coverage area or if it is at another site with adjacent geographic coverage. Any overlapping or adjacent geographic coverage will make a channel adjacent.

Selecting the channel can include determining multiple channels assigned to the desired talkgroup and selecting the desired channel from the multiple channels assigned to the desired talkgroup. In addition, a subscriber unit may receive an updated talkgroup assignment list for the selected channel and when the desired talkgroup is removed from the updated talkgroup list, use the updated talkgroup assignment lists to select a different channel assigned to the desired talkgroup to continue communicating with the desired talkgroup. Furthermore, the signal quality may be monitored for the selected channel; and when the signal quality falls below a signal quality threshold, the subscriber unit uses the received talkgroup assignment lists to select a different channel assigned to the desired talkgroup to continue communicating with the desired talkgroup.

The talkgroup assignment lists are received in broadcast or multicast messages for the plurality of channels. The subscriber unit accesses a list of channels and scans the list of channels for transmissions that include the talkgroup assignment lists. When the desired talkgroup channel is found, the subscriber unit registers with the system and affiliates to the desired talkgroup on the selected channel.

From an infrastructure vantage point, a method comprises developing a talkgroup assignment list for at least one channel in the conventional multi-channel communication system that identifies a set of talkgroups assigned to use the corresponding channel. The infrastructure transmits the talkgroup assignment list for the at least one channel over the channel(s) it supports in the multi-channel communication system. The talkgroup assignment list is used by the subscriber unit to select a channel for group communications, register with the system, and affiliate with a talkgroup supported by the selected channel. An updated talkgroup assignment list for the channel may be developed and transmitted as needed or periodically by broadcast or multicast techniques over each channel in the multi-channel conventional communication system.

As used herein, a talkgroup is a group or collection of members, subscribers, and/or subscriber units (collectively referred to herein as "members") configured for group communications over a communication system. Also, in general, a channel or channels comprise the physical and/or non-tangible communication resources (e.g., radio frequency (RF) resources) over which information is conveyed within the communication network. Channels can be wireless or wired. Also, as used herein, an infrastructure device is a device that is a part of a fixed network infrastructure and can receive information (either control or media, e.g., data, voice (audio), video, etc.) in a signal from a wireless communication device and transmit information in signals to one or more wireless communication devices via a channel or channels. As used herein, infrastructure devices includes, but is not limited to, infrastructure devices discussed above, as well as equipment commonly referred to as servers, controllers, base stations, base transceiver stations, repeaters, access points, routers, or any other type of infrastructure equipment interfacing a wireless communication device or subscriber unit in a wireless environment.

A subscriber unit includes, but is not limited to, communication devices that include, but are not limited to, devices commonly referred to as access terminals, mobile radios, portable radios, mobile stations, wireless communications devices, user equipment, mobile devices, or any other narrowband communication device capable of operating in a wired or wireless environment. Examples of digital communication systems include APCO P25 Phase I, APCO P25 Phase II, TETRA, iDEN, and DMR.

Referring now to the figures, and in particular FIG. 1, there is shown a diagram in accordance with the principles of the present disclosure. A diagram of a wide area communication system 100 is shown with geographical communication coverage areas represented by three radio frequency sites (RF site) 110, 120, 130. The geographical area supported by each RF site is represented by an oval. Each RF site 110, 120, 130 includes infrastructure 111, 121, 131 respectively, which transmits and relays communications between subscriber units and each other on channels supported by the infrastructure. In the present example, the infrastructure 111 supports three communication channels 115, 116, and 117, while infrastructure 121 supports communication channels 125, 126, and 127, and infrastructure 131 supports communication channels 135, 136, and 137.

In the present example illustrated in FIG. 1, the geographical area over which each RF site 110, 120, and 130 extend overlap. As such, subscriber units may be entirely supported by one channel in one RF site or may be supported by two or more channels in a plurality of RF sites depending on their physical geographical location or system allocation. For example, in FIG. 1, subscriber units 112 and 114 are supported by channels 115 and 117 respectively. Subscriber units 122, 123, and 124 are supported by channels 125, 126, and 127 respectively, and subscriber units 132, 133, and 134 are supported by channels 135, 136, and 137 respectively.

Subscriber unit 113 is geographically located in an area 140 that is supported by more than one channel. In the present example, infrastructure 111 supports the area 140 with channel 116, infrastructure 121 supports the area 140 with channel 126, and infrastructure 131 supports the area 140 with channel 136. Thus, subscriber unit 113 may be supported by multiple channels, such as channels 116, 126, or 136.

The subscriber units in the various RF sites may belong to one or more talkgroups. In the present example, each talkgroup is assigned to a channel in the various RF sites. For example, as shown in TABLE 1 below, subscriber units 113, 123, and 133 may all belong to a Talkgroup B, while subscriber units 112, 122, and 132 all form Talkgroup A, and subscriber units 114, 124, and 134 form a third Talkgroup C. Each talkgroup is supported by a channel in each of the RF sites in the present example. Talkgroup A is assigned to channel 115, channel 125, and channel 117. Talkgroup B is assigned to channel 116, channel 126, and channel 136. Talkgroup C, in the present example, is assigned to channel 117, channel 127, and channel 137.

TABLE 1

| Subscriber Units | Talkgroup | Channels supporting talkgroup |
| --- | --- | --- |
| 112, 122, and 132 | Talkgroup A | 115, 125, and 135 |
| 113, 123, and 133 | Talkgroup B | 116, 126, and 136 |
| 114, 124, and 134 | Talkgroup C | 117, 127, and 137 |

It is understood that not all talkgroups may be supported in all RF sites and the configuration above is given for example purposes only and is not intended to limit the present disclosure.

In order for a subscriber unit, such as subscriber unit 113 to select a channel for group communication when roaming into an area that may have multiple channels supporting the area or when it leaves the coverage area of a channel for another in a conventional multi-channel communication system, the subscriber unit must determine which channels support which talkgroups in the new area.

Figure 2:
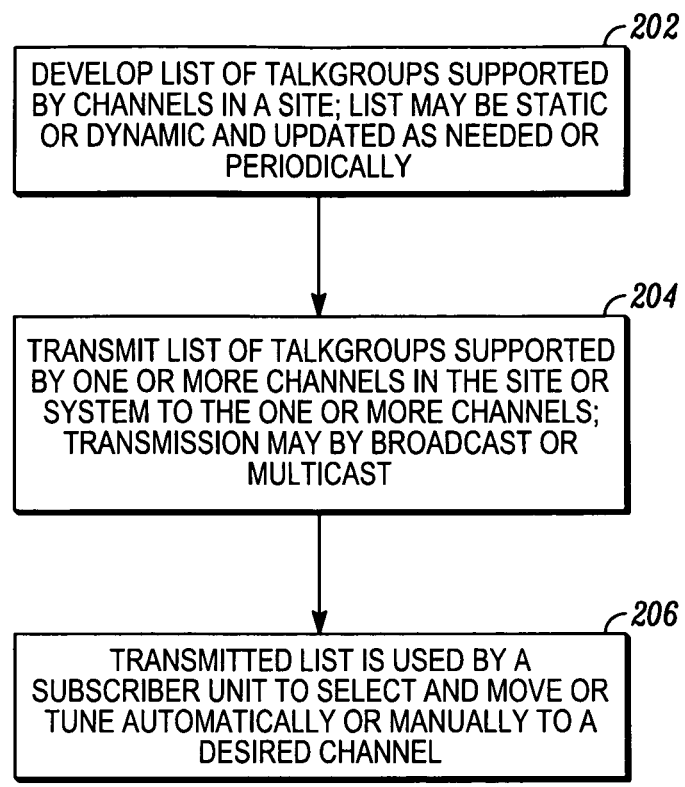
FIG. 2 is a flowchart illustrating a method in accordance with some embodiments.

Thus, turning now to FIG. 2, a talkgroup assignment list is developed for at least one channel in the conventional multi-channel communication system that identifies a set of talkgroups assigned to use the corresponding channel, block 220. For example, TABLES 2-4 below give an example of a talkgroup assignment list that may be developed for the diagram of FIG. 1.

TABLE 2

| Infrastructure 111: Channel | Talkgroup Assigned |
| --- | --- |
| 115 | Talkgroup A |
| 116 | Talkgroup A, B, and C |
| 117 | Talkgroup C |

TABLE 3

| Infrastructure 121: Channel | Talkgroup Assigned |
| --- | --- |
| 125 | Talkgroup A |
| 126 | Talkgroup B and C |
| 127 | Talkgroup C |

TABLE 4

| Infrastructure 131: Channel | Talkgroup Assigned |
| --- | --- |
| 135 | Talkgroup A |
| 136 | Talkgroup A and C |
| 137 | Talkgroup C |

It is understood that one or more talkgroup assignment lists may be created. The infrastructure then transmits the talkgroup assignment list for the at least one channel to a subscriber unit in the multi-channel communication system, block 204. For example, infrastructure 111 conveys its talkgroup assignment list shown in TABLE 2 for the channels within its geographical support area. Similarly, infrastructure 121 of RF site 120 conveys its talkgroup assignment list as shown in TABLE 3 for the channels within its geographical support area, and infrastructure 131 of RF site 130 conveys its talkgroup assignment list of TABLE 4 for the channels within its geographical support area. The talkgroup assignment lists are transmitted periodically to each channel in the multi-channel conventional communication system. The talkgroups lists may be static. Alternatively, an updated talkgroup assignment list for each channel also may be developed and transmitted periodically by broadcast or multicast over the channels. In one embodiment, each infrastructure broadcasts (multicasts) the talkgroup lists that are supported at its own site (including adjacent channels at the site). In another embodiment, the infrastructure in an RF site also broadcasts (or multicasts) the talkgroup assignment lists of adjacent channels at other RF sites. The broadcast interval of the list is configurable.

In this embodiment, the infrastructure supports broadcast of adjacent channel frequencies to allow the subscriber unit to move to channels for which it is not configured. For example, in FIG. 1, infrastructure 111 could also broadcast to subscriber unit 113, over channel 116, that adjacent channel 126 also supports talkgroup B. Therefore, even if subscriber unit 113 is not configured for channel 126, it is aware that the talkgroup to which it belongs is also serviced by channel 126 if the signal quality on channel 116 diminishes due to, for example, subscriber unit 113 roaming out of the signal area for channel 116.

This talkgroup list allows the subscriber unit to select the appropriate channel in a coverage area for its talkgroup, without necessarily being configured for the channel. The talkgroup assignment list is also used to register with the system and affiliate with a talkgroup supported by the at least one channel in the conventional multi-channel communication system, block 206. The infrastructure supports registration/affiliation of subscriber units using any suitable method, allowing the infrastructure to determine the location of subscriber units and talkgroups, to allow the infrastructure to connect to them, and to allow voice to be appropriately routed.

Figure 3:
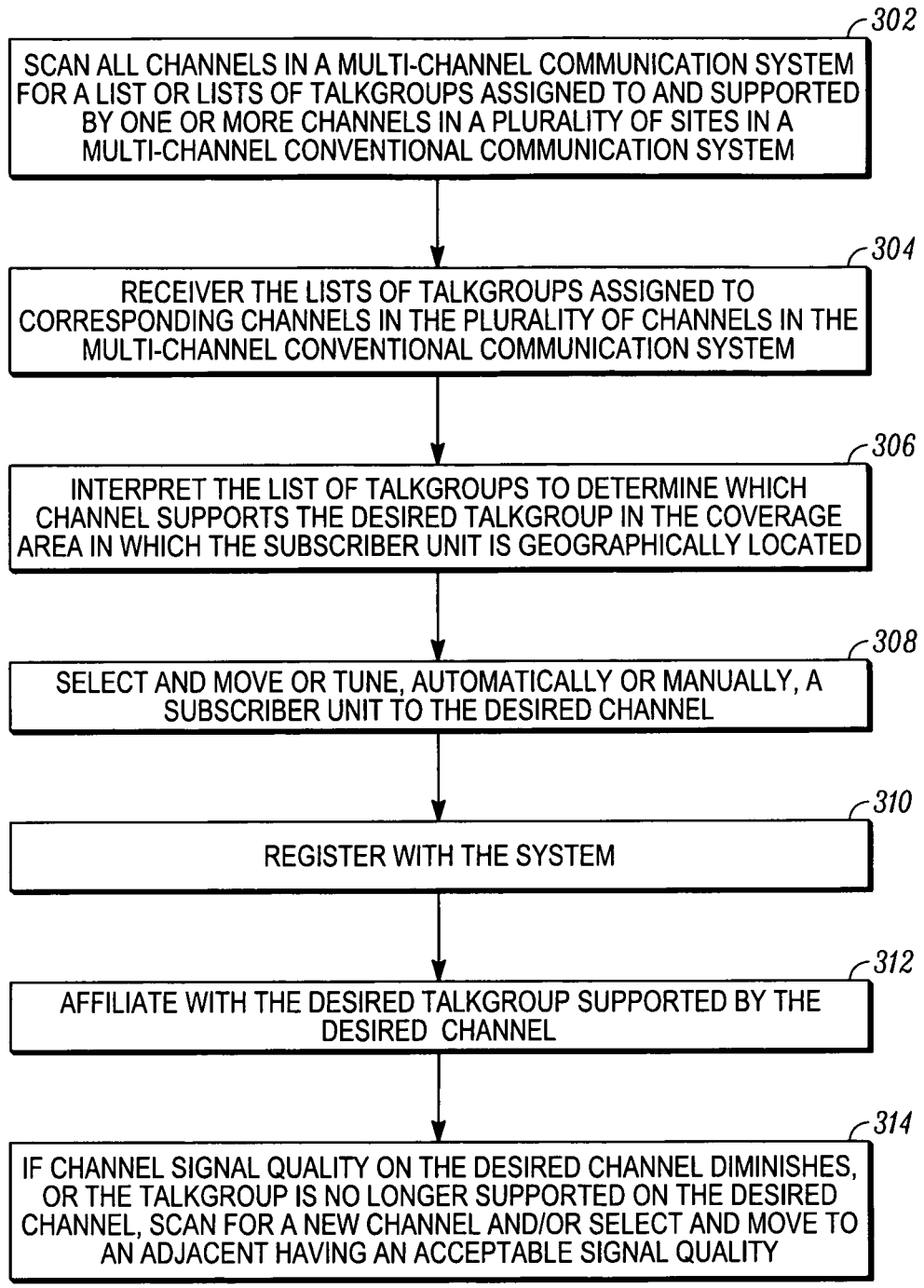
FIG. 3 is another flowchart illustrating a method in accordance with some embodiments.
Figure 4:
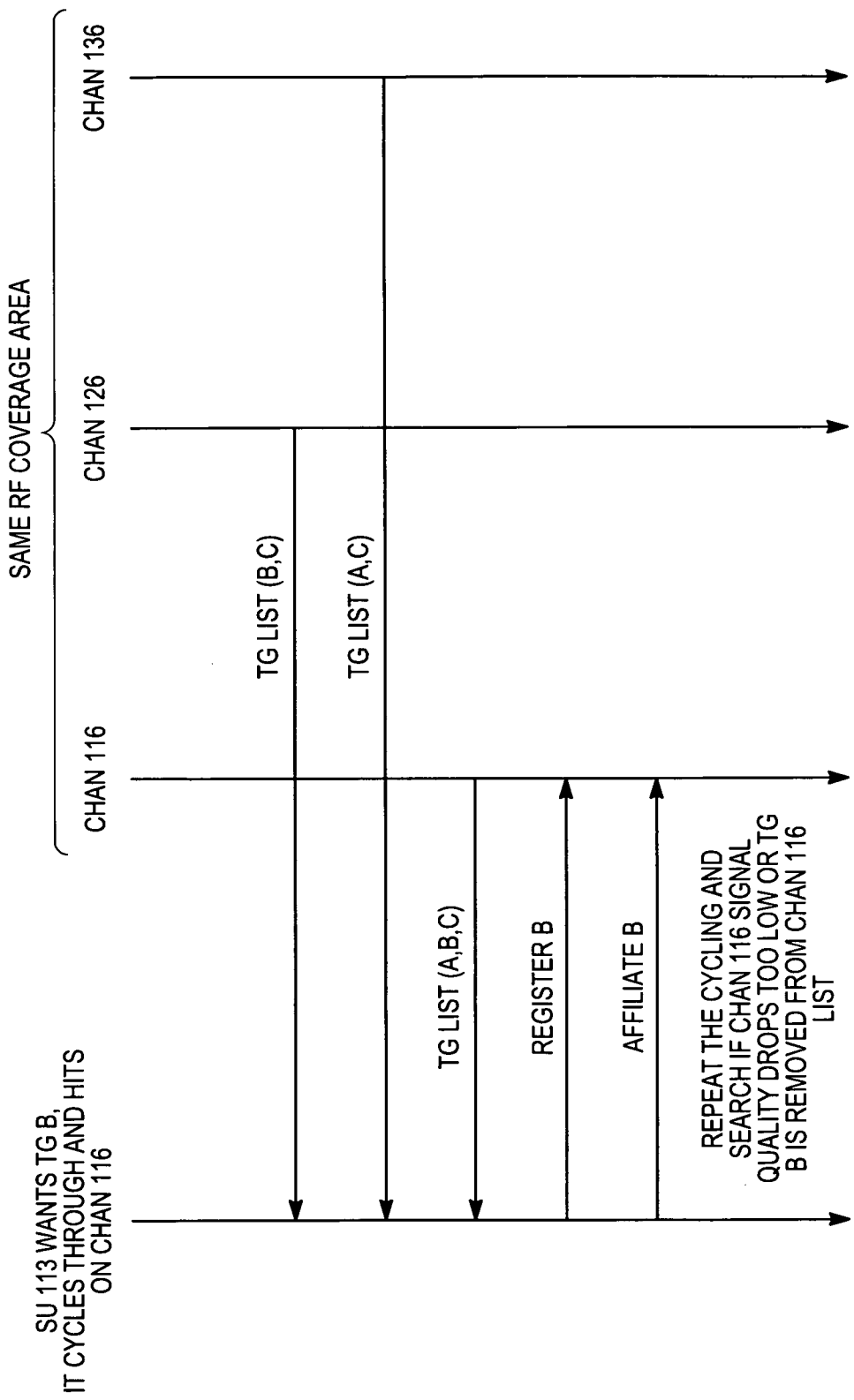
FIG. 4 is an illustrative signaling diagram in accordance with some embodiments.

Turning now to FIG. 3, another flowchart is shown for selecting a channel for group communications in a conventional multi-channel communication system. A subscriber unit scans the system for a list or lists of talkgroups assigned to and supported by one or more channels in the plurality of channels in the system, block 302. For example, referring to FIG. 4 (in conjunction with FIGS. 1 and 3), subscriber unit 113 scans the channels available to it in area 140, that being channels 116, 126, and 136 for a list or lists of talkgroups assigned to the channels.

The subscriber unit receives, for each of the plurality of channels in a multi-channel communication system, a talkgroup assignment list for at least one channel that identifies a set of talkgroups assigned to use the corresponding channel, wherein a subscriber unit receives talkgroup assignment lists for multiple different channels, block 304. For example, referring again to FIG. 4, the subscriber unit 113 receives talkgroup assignment lists from channels 116, 126, and 136.

The received talkgroup assignment lists comprise a first talkgroup assignment list for a first channel having a coverage area in which the subscriber unit is currently geographically located and a second talkgroup assignment list for an adjacent channel to the first channel. The subscriber unit, having received the talkgroup lists, interprets the list and determines a desired talkgroup, block 306. The subscriber unit must have a list of channels that it is allowed to operate upon. It can be configured with this list, or develop it from adjacent channel broadcasts. For example, referring again to FIG. 4, the subscriber unit 113 interprets the list and determines that its desired talkgroup, Talkgroup B, is supported by channels 116 and 126 in area 140.

The subscriber unit selects a channel assigned to the desired talkgroup using the received talkgroup assignment lists, block 308. For example, referring again to FIG. 4, the subscriber unit 113 selects channel 116. It may select a particular channel for a variety of reasons; for example, a channel may be chosen because its signal quality is better than another.

The subscriber unit can then register with the system, block 310, and affiliate with the desired talkgroup supported by the channel, block 312. For example, a subscriber unit may move into a coverage area for the adjacent channel and, using the second talkgroup assignment list, select the adjacent channel to continue communicating with the desired talkgroup. For example, referring again to FIG. 4, subscriber unit 113 can register with the system and affiliate with Talkgroup B if it has not already done so.

If channel signal quality on the desired channel diminishes, or the talkgroup is no longer supported on the desired channel, the subscriber unit can scan for a new channel and/or select and move to an adjacent channel, of which it has already been made aware through a talkgroup list, having an acceptable signal quality, block 314, for instance as defined by a signal quality threshold. For example, if subscriber unit 113 then moves such that the signal quality increases on channel 126, it can select channel 126, register with the infrastructure 121 and affiliate with Talkgroup B on channel 126. The newly selected channel is used for communicating with the desired talkgroup.

Thus, selecting the channel can comprise determining multiple channels assigned to the desired talkgroup and selecting the channel of the multiple channels assigned to the desired talkgroup having an acceptable signal quality. In addition, a subscriber unit may receive an updated talkgroup assignment list for the selected channel and when the desired talkgroup is removed from the updated talkgroup list, use the received talkgroup assignment lists to select a different channel assigned to the desired talkgroup to continue communicating with the desired talkgroup. Furthermore, the signal quality may be monitored for the selected channel and when the signal quality falls below a signal quality threshold, the subscriber unit uses the received talkgroup assignment lists to select a different channel assigned to the desired talkgroup to continue communicating with the desired talkgroup.

The talkgroup assignment lists are received in broadcast or multicast messages over the plurality of channels. The subscriber unit accesses a list of channels and scans the list of channels for transmissions that include the talkgroup assignment lists. When the desired talkgroup channel is found, the subscriber unit registers with and affiliates to the desired talkgroup on the selected channel. The subscriber registers and affiliates on the channel it selects, for example, using the well known methods used for trunking operation.

In conclusion, the benefits of the present disclosure are many. Subscribers are able to locate talkgroups on channels for which they are not configured and can move automatically or manually to the channels based on the talkgroup and signal quality. Subscriber units build up their list of channel assignments based on broadcast or multicast information and can select a desired channel quickly and easily. Those skilled in the art will realize that the above recognized advantages and other advantages described herein are merely illustrative and are not meant to be a complete rendering of all of the advantages of the various embodiments.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for indicating status of channels assigned to a talkgroup described herein. The non-processor circuits may include, but are not limited to, a radio receiver, a radio transmitter, signal drivers, clock circuits, power source circuits, and user input devices. As such, these functions may be interpreted as steps of a method to perform the indicating of status of channels assigned to a talkgroup described herein.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for selecting a channel for group communications in a conventional multi-channel communication system, the method comprising:
   at a subscriber unit associated with a first talkgroup in the conventional multi-channel communication system:
   receiving talkgroup assignment list over a channel as a broadcast or multicast messages for each of a plurality of different channels in the multi-channel communication system, the talkgroup assignment list comprising a first channel identifier and a talkgroup associated with the first channel, the talkgroup assignment list additionally comprising a second channel identifier and a second and a third talkgroup associated with the second channel, the talkgroup assignment list additionally comprising a third channel identifier and a fourth talkgroup associated with the third channel;
   determining a desired talkgroup;
   selecting a channel assigned to the desired talkgroup using the received talkgroup assignment lists, wherein the selected channel is used for communicating with the desired talkgroup;
   a first talkgroup assignment list for a first channel having a coverage area in which the subscriber unit is currently geographically located; and
   a second talkgroup assignment list for an adjacent channel to the first channel.

2. The method of claim 1 further comprising:
   moving into a coverage area for the adjacent channel; and
   using the second talkgroup assignment list to select the adjacent channel to continue communicating with the desired talkgroup.

3. The method of claim 1 further comprising:
   receiving an updated talkgroup assignment list for the selected channel; and
   when the desired talkgroup is removed from the updated talkgroup list, using the received talkgroup assignment lists to select a different channel assigned to the desired talkgroup to continue communicating with the desired talkgroup.

4. The method of claim 1 further comprising:
   monitoring signal quality for the selected channel; and
   when the signal quality falls below a signal quality threshold, using the received talkgroup assignment lists to select a different channel assigned to the desired talkgroup to continue communicating with the desired talkgroup.

5. The method of claim 1, wherein the talkgroup assignment lists are received in broadcast messages from the plurality of channels.

6. The method of claim 1, wherein the talkgroup assignment lists are received in multicast messages from the plurality of channels.

7. The method of claim 1 further comprising:
   accessing a list of channels; and
   scanning the list of channels for transmissions that include the talkgroup assignment lists.

8. The method of claim 1 further comprising registering with the multi-channel communication system and affiliating to the desired talkgroup on the selected channel.

9. A method for selecting a channel for group communications in a conventional multi-channel communication system, the method comprising:
   developing a talkgroup assignment list for at least one channel in the conventional multi-channel communication system the list comprising a first channel identifier and a talkgroup associated with the first channel, the talkgroup assignment list additionally comprising a second channel identifier and a second and a third talkgroup associated with the second channel, the talkgroup assignment list additionally comprising a third channel identifier and a fourth talkgroup associated with the third channel; and
   transmitting the talkgroup assignment list for the at least one channel to a subscriber unit of a talkgroup in the conventional multi-channel communication system as part of a broadcast or multicast message, wherein the talkgroup assignment list is used by the subscriber unit to select a channel of the at least one channel based on a desired talkgroup and further wherein, the talkgroup assignment list is used to register and affiliate with a talkgroup supported by the at least one channel
   developing an updated talkgroup assignment list for the channel; and
   transmitting the updated talkgroup assignment list for the channel.

10. The method of claim 9, wherein the talkgroup assignment list is transmitted in broadcast messages.

11. The method of claim 9, wherein the talkgroup assignment list is transmitted in multicast messages.

12. The method of claim 9, wherein the talkgroup assignment list is transmitted periodically by each channel in the multi-channel conventional communication system.

\* \* \* \* \*